US011538598B2

(12) United States Patent
Lane et al.

(10) Patent No.: US 11,538,598 B2
(45) Date of Patent: Dec. 27, 2022

(54) FLOW RESTRICTING SLIP JOINT CLAMPS AND METHODS FOR USE IN A NUCLEAR REACTOR JET PUMP

(71) Applicant: GE-Hitachi Nuclear Energy Americas LLC, Wilmington, NC (US)

(72) Inventors: Hampton W. Lane, Wilmington, NC (US); Bret E. Nelson, Wilmington, NC (US); Brandon J. Schoonmaker, Wilmington, NC (US); Lee J. Andre, Wilmington, NC (US); Hugo P. Rooney, Wilmington, NC (US); David J. Bell, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 895 days.

(21) Appl. No.: 16/173,117

(22) Filed: Oct. 29, 2018

(65) Prior Publication Data

US 2020/0135348 A1    Apr. 30, 2020

(51) Int. Cl.
| | |
|---|---|
| F16L 23/12 | (2006.01) |
| G21C 13/032 | (2006.01) |
| G21C 15/25 | (2006.01) |
| F16L 23/028 | (2006.01) |
| F04F 5/46 | (2006.01) |

(52) U.S. Cl.
CPC ........... G21C 13/032 (2013.01); F04F 5/461 (2013.01); F16L 23/0283 (2013.01); F16L 23/12 (2013.01); G21C 15/25 (2013.01)

(58) Field of Classification Search
USPC ....... 285/121.4, 123.11, 123.12, 123.13, 298
See application file for complete search history.

(56) References Cited

U.S. PATENT DOCUMENTS

| | | | |
|---|---|---|---|
| 4,371,198 A | 2/1983 | Martin | |
| 5,600,687 A | 2/1997 | Welsh | |
| 8,661,645 B2 | 3/2014 | Lemser et al. | |
| 2005/0135904 A1 | 6/2005 | Wivagg et al. | |
| 2007/0146480 A1 | 6/2007 | Judge, Jr. et al. | |
| 2008/0029969 A1 | 2/2008 | Torres | |
| 2008/0317192 A1 | 12/2008 | Rowell et al. | |

(Continued)

OTHER PUBLICATIONS

WIPO, International Search Report in Corresponding PCT Application PCT/US2019/058548, dated Feb. 20, 2020.

(Continued)

*Primary Examiner* — Essama Omgba
*Assistant Examiner* — Geoffrey S Lee
(74) *Attorney, Agent, or Firm* — Ryan Alley IP

(57) ABSTRACT

Clamps can be secured to a slip joint and limit flow through the same by seating on a diffuser axially regardless of wear and damage in the slip joint. An extension from the clamp seats to the inlet mixer. These extensions can be adjusted from outside the clamp to achieve an individual preload or flow limitation through the slip joint. The extension may be an O-ring or other shape. A biasing drive may connect to and move the extension from an outside surface of the clamp. The biasing drive may include a threaded cap in an outer groove that is linked to a plunger via a spring. Clamps are fabricated of materials that maintain their physical properties when exposed to an operating nuclear reactor environment and may be relatively rigid and resilient metals.

16 Claims, 6 Drawing Sheets

(56) References Cited

U.S. PATENT DOCUMENTS

| | | |
|---|---|---|
| 2012/0012728 A1* | 1/2012 | Bass .................... F04F 5/54 |
| | | 248/617 |
| 2014/0079468 A1* | 3/2014 | Jensen .................. F04F 5/46 |
| | | 403/188 |
| 2016/0016267 A1 | 1/2016 | Beatty et al. |
| 2016/0137315 A1 | 5/2016 | Noel |
| 2017/0140844 A1 | 5/2017 | Kelemen |
| 2017/0321726 A1 | 11/2017 | Lane et al. |

OTHER PUBLICATIONS

WIPO, Written Opinion in Corresponding PCT Application PCT/US2019/058548, dated Feb. 20, 2020.

* cited by examiner

FLOW RESTRICTING SLIP JOINT CLAMPS AND METHODS FOR USE IN A NUCLEAR REACTOR JET PUMP

BACKGROUND

FIG. 1 is a perspective view of a related art nuclear boiling water reactor (BWR) jet pump assembly 8. The major components of the jet pump assembly 8 include a riser pipe 3 and two inlet mixers 4 that insert into respective diffusers 2. Jet pump restrainer brackets are used to stabilize movement of the inlet mixers 4 and reduce movement of and leakage at slip joint 6 that exists at the interface between inlet mixers 4 and diffusers 2. One type of movement is Flow Induced Vibration, or FIV, that causes slip joint leakage due to high-velocity flows in and around assembly 8. Restrainer brackets minimize relative movement between inlet mixers 4 and restrainer brackets to minimize leakage or damage around slip joint 6.

FIG. 2 is a detailed view of related art slip joint 6 that exists between inlet mixer 4 and diffuser 2 of a BWR jet pump assembly. Bottom portion 4a of the inlet mixer 4 inserts into upper crown 2a of diffuser 2. A top edge of diffuser 2 includes one or more guide ears 2b to allow tolerances and easier connection between inlet mixer 4 and diffuser 2. The interface or mating between inlet mixer 4 and diffuser 2 is referred to as slip joint 6.

FIG. 3 is a cross-sectional view of related art slip joint 6 between inlet mixer 4 and diffuser 2 of a BWR jet pump assembly, showing internal relationships between components. Lowest distal end 4b of inlet mixer 4 rests in upper crown 2a of diffuser 2, to form slip joint 6. Inlet mixer FIV may occur in the slip joint 6 when tolerances between distal end 4b of inlet mixer 4 and upper crown 2a of diffuser 2 do not exactly match due to wear or improper machining. Leakage may occur at this interface due to both a poor fit and FIV, as fluid coolant leaks between lowest distal end 4b of inlet mixer 4 and upper crown 2a of diffuser 2 and out of the slip joint 6.

FIG. 4 is an illustration of a related art slip joint clamp 100 from co-owned US Patent Publication 2017/0321726 to Lane et al. published Nov. 9, 2017 and incorporated by reference herein in its entirety. As seen in FIG. 4, slip joint clamp 100 is shaped to match an inlet mixer and diffuser interface at a slip joint, such as an annular shape. Slip joint clamp 100 is shaped to seat axially onto a diffuser (such as diffuser 2 in FIG. 2) while surrounding an exterior of an inlet mixer (such as inlet mixer 4 in FIG. 2) at a slip joint. Slip joint clamp 100 may completely or partially surround and/or fill a slip joint by seating on a diffuser and surrounding an inlet mixer of the slip joint.

Related art slip joint clamp 100 may include two ring halves 120 that are joined to form an annular shape or other shape to match a slip joint shape. Ring halves 120 may be moveable with respect to one another if joined by a hinge or socket or any other relative joining mechanism, including a clevis pin 130, for example. Clevis pin 130 may permit ring halves 120 to expand/be separated in a transverse or radial direction without fully disconnecting or moving relatively in an axial position, allowing clamp 100 to adjust to and move over diffuser and/or inlet mixer structures. In this way, slip joint clamp 100 can be installed about a slip joint without disassembly of any inlet mixer or diffuser, because clamp 100 can open halves 120 to fit around such structures and close halves 120 when in place on a diffuser, for example.

Related art slip joint clamp 100 may include a fastening element to ensure it may be expanded in a transverse direction so as to be removably installed about a slip joint. For example, a collar bolt 135 may be used to engage and draw together ring halves 120, such as by screwing into one half 120 while being mounted in another half 120, to form a substantially annular shape of clamp 100 with no relative movement of ring halves 120 when collar bolt 135 is engaged between the two. Collar bolt 135 may not apply additional tension or shaping beyond a point when ring halves 120 are fully mated; that is, collar bolt 135 may rigidly yet removably join ring halves 120 into a configuration that mounts on a diffuser without potential for additional clamping from collar bolt 135 when so joined. In this way, clamp 100 may remain reliably closed without significantly transversely loading a diffuser on which it seats.

Slip joint clamp 100 includes an inner surface 121 that is shaped to seat against an inlet mixer and extend down along an inner surface of a diffuser at a slip joint. Inner surface 121 may be formed by ring halves 120, for example, being brought together about clevis pin 130 and closed into a ring shape. Inner surface 121 may be substantially annular at higher axial positions to match an outer surface of a cylindrical inlet mixer. Inner surface 121 may further include a flange or thinner ring element at a lower axial position that matches an interface between an outer surface of a cylindrical diffuser and an inner surface of a cylindrical diffuser at the slip joint. In this way, related art slip joint clamp 100 may be shaped and sized like a sleeve that internally fits against a diffuser while externally seating on a top of the diffuser and fitting externally against an inlet mixer.

Slip joint clamp 100 may include axial joints or anchors that retain clamp 100 on an upper end, such as a crown, of a diffuser at a slip joint. For example, ear clamp 181 may be shaped and sized to clamp around a guide ear of a diffuser (such as ear 2b in FIG. 2) in order to axially hold clamp 100 at a top end of a diffuser. A draw bolt 182 may be paired with ear clamp 181 to allow axial movement of ear clamp 181 and thus clamping against a lower side of the ear. Further, a ratchet surface 190 or other locking mechanism can permit one-way movement or tensioned securing of draw bolt 182 when paired with a matching ratchet surface of draw bolt 182 in clamp 100. When draw bolt 182 is turned, ear clamp 181 may be drawn upward against an ear or other surface, axially clamping clamp 100, and ratchet surface 190 may prevent reversing of draw bolt 182 and thus loosening.

Multiple sets of ear clamp 181, draw bolt 182, and ratchet 190 may be positioned about clamp 100. In this way, clamp 100 may be axially secured to and tightened against each guide ear at multiple radial positions, ensuring clamp 100 remains stationary and secure while exerting axial clamping forces only against a top end of a diffuser. When halves 120 and inner surface 121 are shaped to substantially fill a slip joint between a diffuser and inlet mixer, axial securing of clamp 100 may prevent fluid from escaping the slip joint.

Related art slip joint clamp 100 includes a lateral-loading drive that can independently push or bias an inlet mixer at a slip joint to a desired preloading condition. Such lateral loading may secure the inlet mixer against inner surface 121 and further prevent FIV and leakage. The lateral-loading drive provides at least up to 750 pounds-force of lateral preload against an inlet mixer. For example, a leaf spring 140 may be laterally driven by a lateral driving bolt 160 mounted in a top plate 150. A ratchet surface 170 may allow tightening or one-way movement of driving bolt 160 until 750 or more pounds of force are exerted by leaf spring 140.

SUMMARY

Example embodiments include slip joint clamps that can be tightened in multiple directions from an outside of the clamp without loading a diffuser axially. Example clamps may include clamp arms shaped to clamp around a top end of the diffuser and against an outer surface of the inlet mixer with an extension that can be adjusted from an inner surface toward the inlet mixer to limit fluid flow past the same. The extension may be an O-ring or other shape that lines the interior of the clamp arms directly contact the inlet mixer so as to limit fluid flow past the inlet mixer and out of the slip joint. A biasing drive connected to and moving the adjustable extension and open to an outside surface of the clamp.

The extension can be individually driven to limit flow by a biasing drive accessible from an outer surface of the clamp, such as via an outer bore, or groove, that connects to an inner groove in which the adjustable extension seats. The biasing drive may include a threaded cap filling and threaded with the outer groove that compresses a spring pushing a plunger. The plunger may reach through to the groove with the extension to move and push the same laterally against the inlet mixer to a desired position and/or preload. The grooves may be shaped to limit extension of the cap, plunger, or extension and/or capture these elements. In this, way, example embodiment clamps can be installed about a slip joint and separately tighten and loosen the flow limiting extension against the inlet mixer. Example embodiment clamps are fabricated of nuclear-reactor-friendly materials that may be alternated or lubricated to prevent fouling and seizing.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
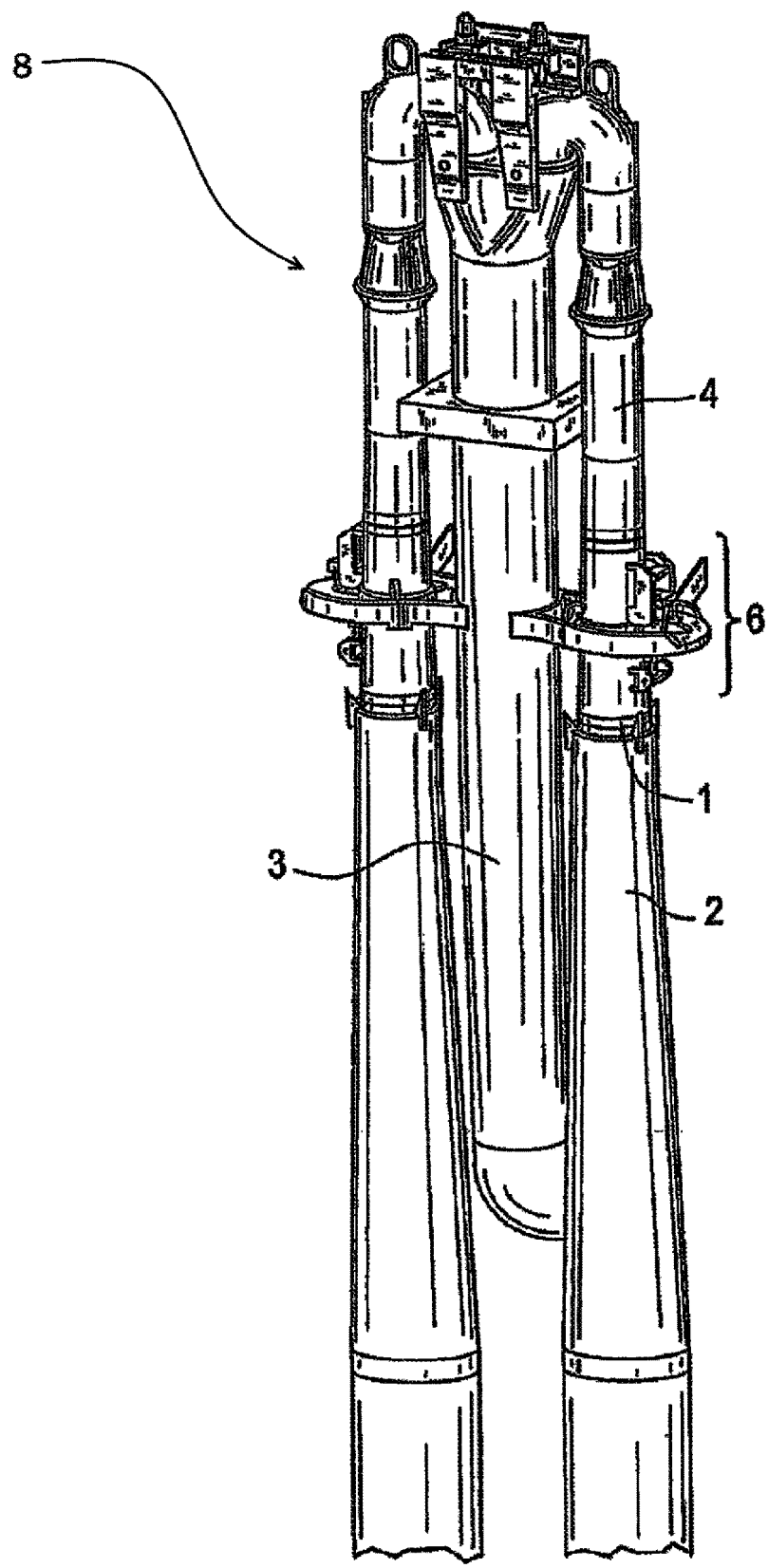
FIG. 1 is an illustration of a related art jet pump assembly for use in a nuclear power plant.
Figure 2:
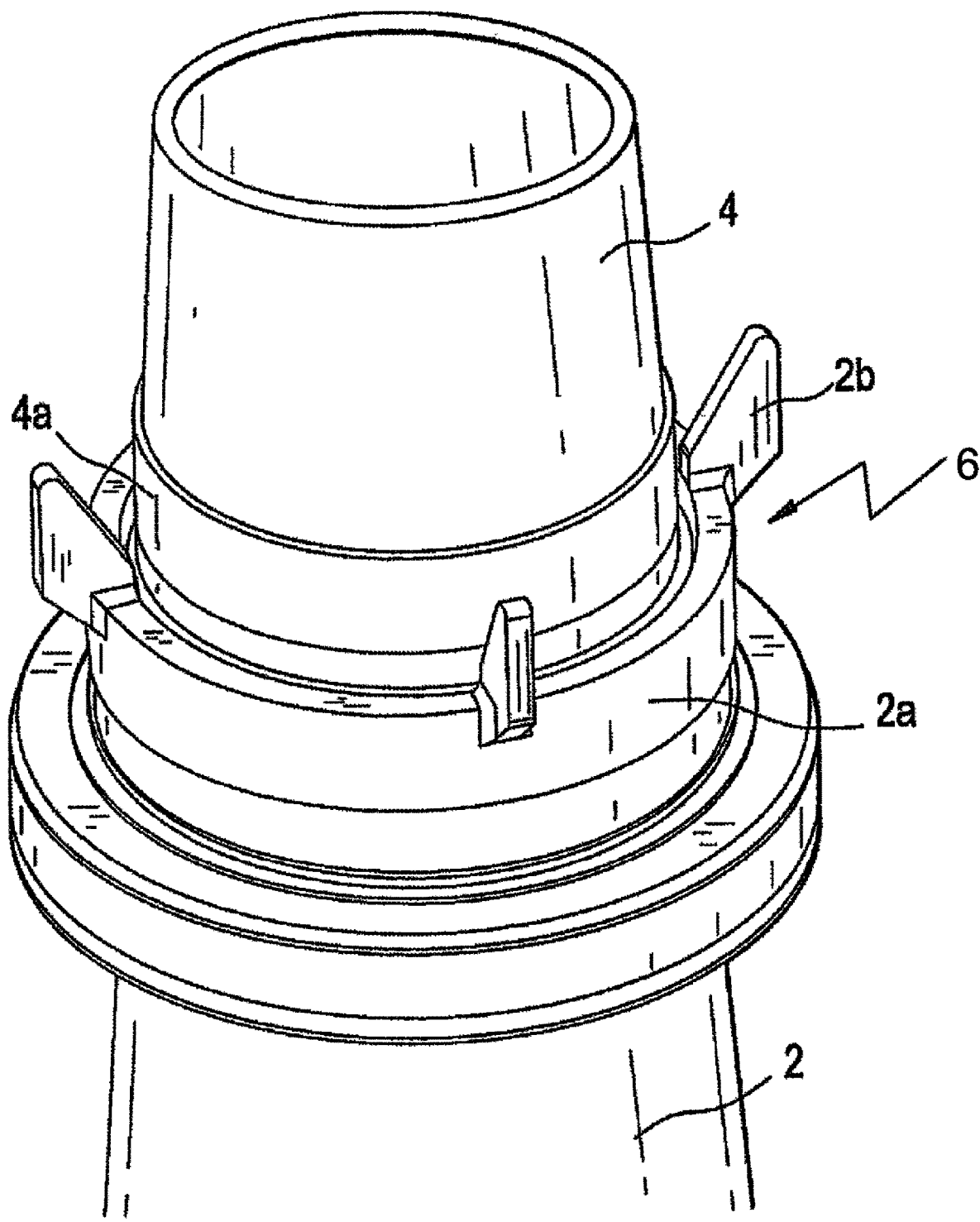
FIG. 2 is an illustration of a slip joint in the related art jet pump assembly of FIG. 1.
Figure 3:
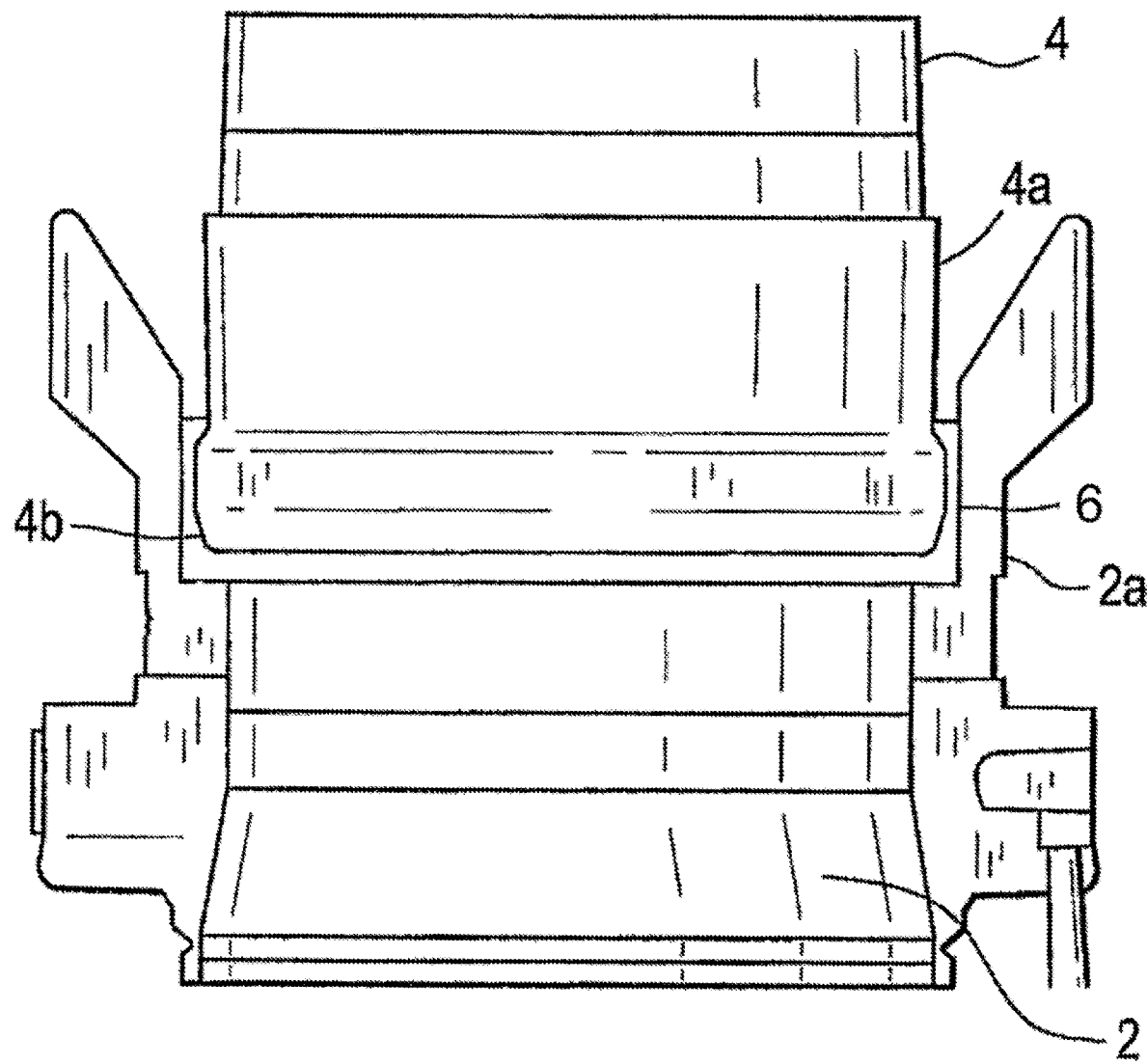
FIG. 3 is a cross-section of the slip joint of FIG. 2.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, "axial" and "vertical" directions are the same up or down directions oriented along the major axis of a nuclear reactor, often in a direction oriented with gravity. "Transverse" directions are perpendicular to the "axial" and are side-to-side directions oriented in a single plane at a particular axial height.

The Inventors have newly recognized a need to limit fluid flow or escape from a damaged and repaired slip joint. The need may be present in a slip joint repair that does not disassemble the slip joint and works with potentially damaged and worn slip joints that are especially prone to leakage. Example embodiments described below uniquely enable solutions to these and other problems discovered by the Inventors.

The present invention is flow-restricted clamps useable with slip joints in nuclear reactor jet pumps and methods of clamping slip joints with the same. In contrast to the present invention, the few example embodiments and example methods discussed below illustrate just a subset of the variety of different configurations that can be used as and/or in connection with the present invention.

Figure 4:
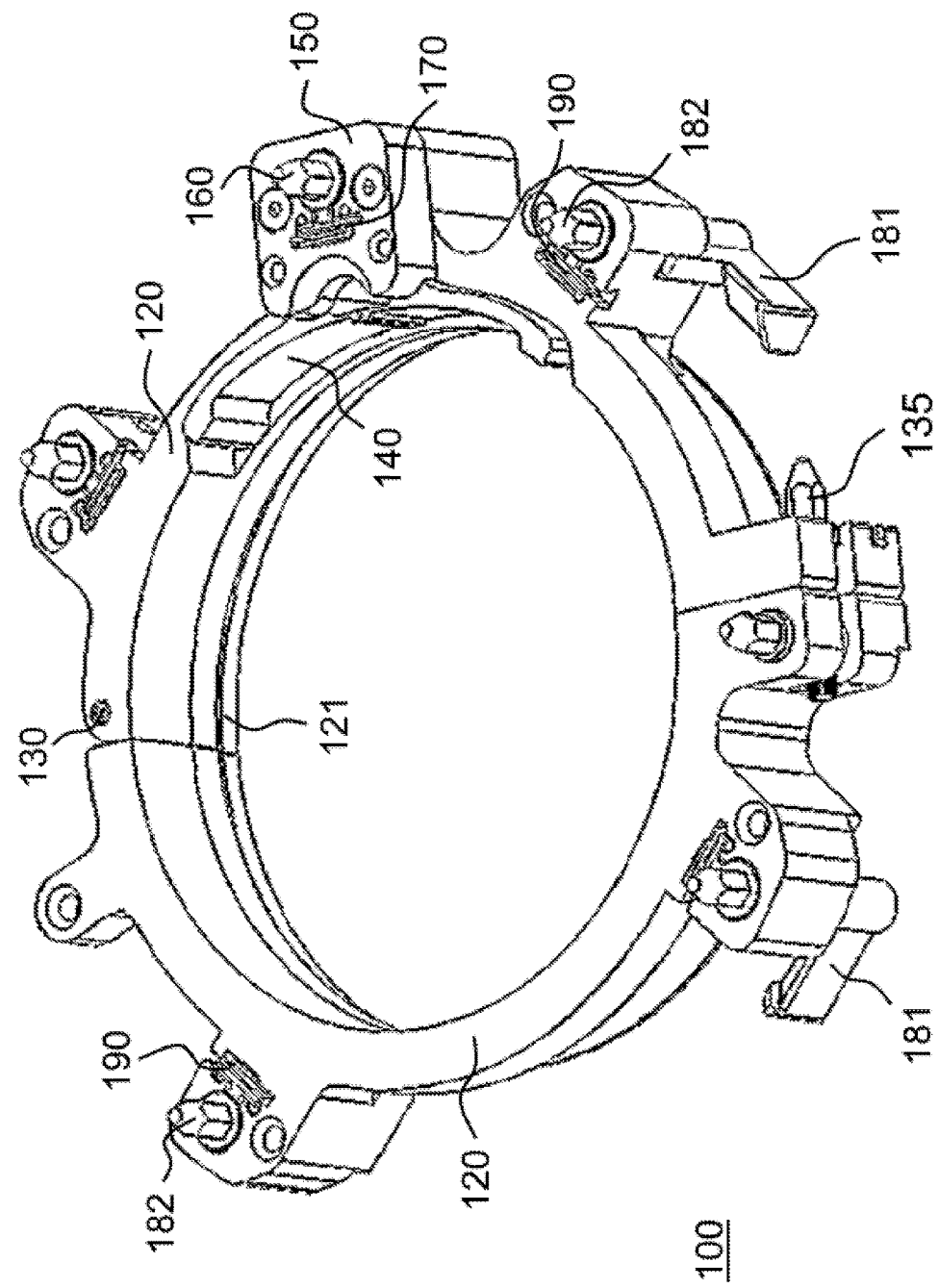
FIG. 4 is an illustration of a related art slip joint clamp.
Figure 5:
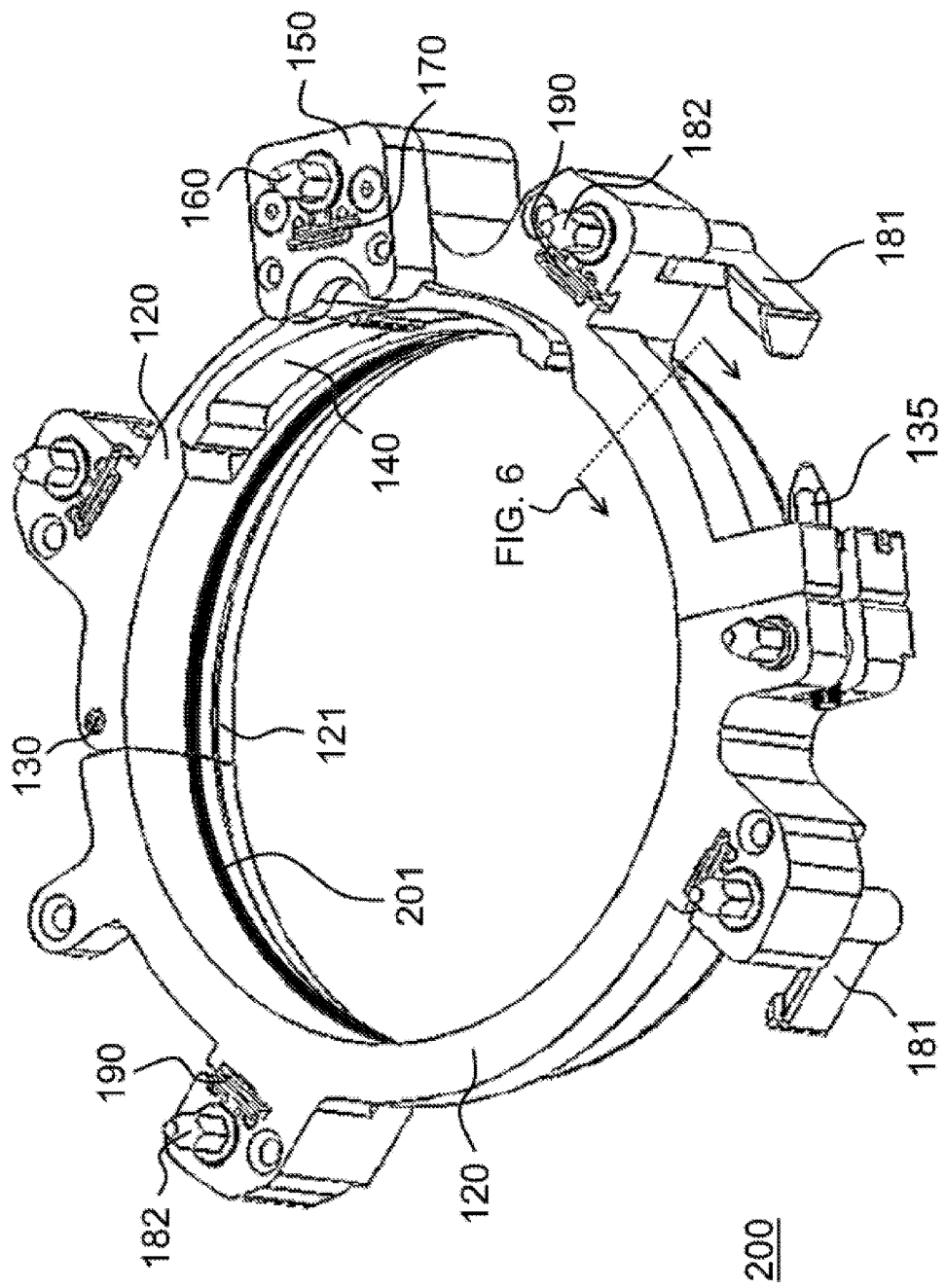
FIG. 5 is an illustration of an example embodiment flow restricting slip joint clamp.

FIG. 5 is an illustration of an example embodiment slip joint clamp 200. As seen in FIG. 5, slip joint clamp 200 may have several features similar to slip joint clamp 100 of FIG. 4, with similar numbering indicating similar parts. Example embodiment slip joint clamp 200 includes an O-ring 201 extending from inner surface 121 of clamp 200. O-ring 201 may completely or partially extend around an inner perimeter of clamp 200 and may be continuous or segmented. For example, O-ring 201 may be in two semi-circular halves, one each with one of two ring halves 120, that together extend around an entire perimeter of inner surface 121. In this way, O-ring 201 may permit opening and disassembly of halves 120 while moving with the same, and example embodiment slip joint clamp 200 can be installed about a slip joint without disassembly of any inlet mixer or diffuser, because clamp 200 can open halves 120 and O-ring 201 to fit around such structures and close halves 120 with O-ring 201 when in place on a diffuser. Of course, O-ring 201 may also be a continuous ring or other shape, and O-ring 201 may only partially continue along perimeter of inner surface 121.

O-ring 201 may be toroidal or another shape to fit around diffuser 4 (FIG. 1). With clamp 200 installed, a bottom outer portion of inlet mixer 4 may seat against O-ring 201 to limit fluid flow out of a slip joint through clamp 200. O-ring 201 may be a resilient material that can be compressed against inlet mixer 4 with minimal or slight deformation, such as a stainless steel or X750 or XM19 alloy. In this way, example embodiment clamp 200 may fit against and limit flow from the slip joint between diffuser 2 and inlet mixer 4, regardless of wear, damage, or non-fit among pieces and without requiring disassembly of a slip joint for installation.

Figure 6:
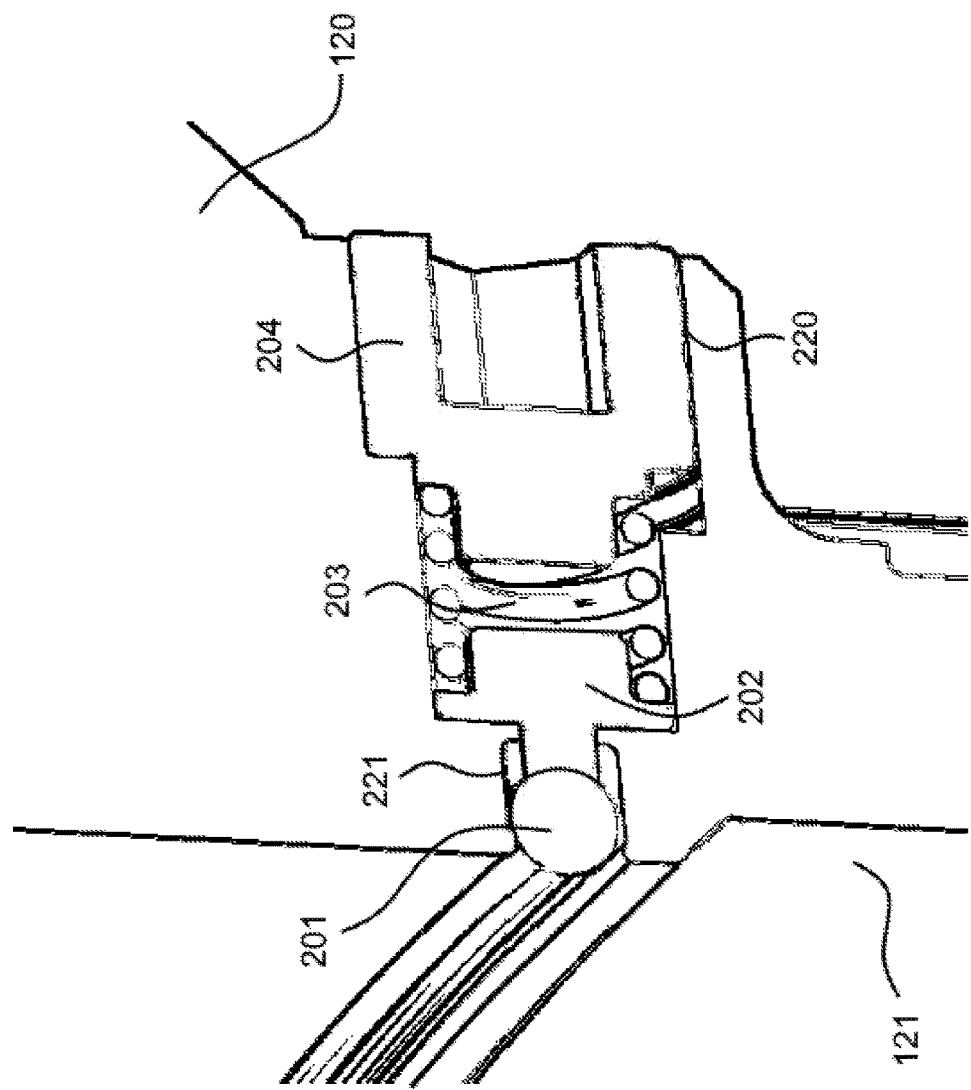
FIG. 6 is a cross-sectional view of the example embodiment slip joint clamp of FIG. 5.

O-ring 201 may be custom biased against an inlet mixer surface. As shown in FIG. 6, O-ring 201 may be housed in groove 221 extending inward from inner surface 121. Groove 221 may include front ledges or another capturing structure to ensure that O-ring 201 remains captured in the same while still being able to extend from the inner surface and limit flow against an inlet mixer. Groove 221 may be machined at any desired location to retain O-ring 201 at a desired axial elevation; for example, as shown in FIG. 5, groove 221 may be positioned just axially under a recess housing leaf spring 140 in example clamp 200. Groove 221 permits biasing plunger 202 to pass through the same transversely and seat against O-ring 201. By transverse extension and retraction, and force in the same direction, biasing plunger 202 may position and bias O-ring 201 at a desired transverse position and with a desired level of force. Outer groove 220 may capture a back flange of plunger 202 to prevent escape or driving past a desired transverse point.

Biasing plunger 202 may be driven from an external position through internal spring 203 and/or threaded cap 204 in outer groove 220. As shown in FIG. 6, internal spring 203 may seat on shoulders or flanges of biasing plunger 202 and threaded cap 204 and convey force between the same, subject to a mediating spring constant. Threaded cap 201 may have a threaded outer surface that meshes with threads of outer groove 220, allowing cap 204 to be driven in the transverse direction against internal spring 203. As cap is rotated in outer groove 220, such as through a hex head or other rotation, it is biased in the lateral direction, compressing or expanding spring 203 against biasing plunger 202. Outer groove 220 may be open from an outer surface of clamp 200, allowing operator access and manipulation of the same.

A single plunger 202 may bias O-ring 201 to a desired fit with an inlet mixer, or multiple sets of plungers 202, springs 203, and caps 204 may be spaced around an outer perimeter of clamp 200, at desired positions to bias O-ring 201 or sections thereof. For example, O-ring 201 could be biased by four such sets at 90-degree intervals about clamp 200. Like the rest of example embodiment clamp 200, the components of FIG. 6 are fabricated of materials that are compatible with an operating nuclear reactor environment, including materials that maintain their physical characteristics when exposed to high-temperature fluids and radiation. For example, metals such as stainless steels and iron alloys, nickel alloys, zirconium alloys, etc. are useable in plunger 202, spring 203, cap 204, etc. Similarly, direct connections between threads of outer groove 220 and cap 204, and contacts among cap 204, spring 203, and plunger 202, and all other direct contact points may be lubricated and fabricated of alternating or otherwise compatible materials to prevent seizing, fouling, or metal-on-metal reactions.

As an example of tightening or loosening O-ring 201, once example embodiment clamp 200 has been mounted on diffuser 2 at the slip joint and closed around inlet mixer 4 (such as by a collar bolt), O-ring 201 may be pressed back in housing groove 221 through contact with inlet mixer 4. An operator may access threaded cap 204 on an exterior of clamp 200 because outer groove 220 opens to the exterior and is not blocked by other components or clamp features. The operator may rotate cap 204 (such as clockwise), driving it laterally inward toward spring 203. This force is conveyed to biasing plunger 202, which may not yet be fully seated at an end of outer groove 220. Biasing plunger 202 then either itself moves and moves O-ring 201 laterally to be in closer contact with an inlet mixer surface, or such contact is tightened and biased under compression of spring 203 while O-ring 201 and plunger 202 move relatively less. At a desired level of preload force, or when leakage drops to a desired level, tightening of cap 204 may stop. Similarly, at removal, rotation of threaded cap 204 may be reversed, loosening and withdrawing O-ring 201 and plunger 202 for removal of clamp 200.

As seen, example embodiment slip joint clamp 200 can be axially secured to a diffuser and independently bias an inlet mixer through an inner surface and a flow-limiting O-ring 201 in its surface. Installation on the diffuser may require attachment only to guide ears or other external structures without movement or involvement with an inlet mixer. Subsequent to installation on an end of the diffuser about a slip joint, example embodiment clamp 200 may be laterally biased via a lateral drive and have 0-ring 201 specifically further biased against the inlet mixer to limit fluid flow out of the slip joint. This independent axial attachment to the diffuser and lateral preload of the inlet mixer may permit installation of example embodiment clamps on a variety of slip joint types and in varying conditions, reduce leakage through such slip joints, and prevent FIV in and damage between slip joint components.

Example embodiments and methods thus being described, it will be appreciated by one skilled in the art that example embodiments may be varied and substituted through routine experimentation while still falling within the scope of the following claims. For example, any number of different leakage-reducing structures and shapes aside from torii can be used in example embodiment clamps, simply through proper dimensioning and positioning. Such variations are not to be regarded as departure from the scope of these claims.

What is claimed is:

1. A clamp for a slip joint formed by a juncture of a diffuser and an inlet mixer in a nuclear reactor, the clamp comprising: at least two opposite clamp arms shaped to fit inside of the diffuser and against the inlet mixer in the slip joint; a leaf spring in a first arm of the two opposite clamp arms, wherein the leaf spring is configured to bias the inlet mixer in a transverse direction against a second arm of the two opposite clamp arms with the clamp closed around the inlet mixer and without significantly transversely loading the diffuser; and an O-ring seated in a perimeter of the two opposite clamp arms, wherein the O-ring fills the slip joint, and wherein the O-ring is configured to bias against the inlet mixer separately from the spring biasing the inlet mixer.

2. The clamp of claim 1, further comprising:
a joint moveably connecting the two opposite clamp arms to permit movement of the two clamp arms around the inlet mixer, wherein the O-ring is adjustable to move in a transverse direction and directly contact the inlet mixer so as to limit fluid flow past the inlet mixer and out of the slip joint.

3. The clamp of claim 2, wherein the two opposite clamp arms are two annular halves that join to form a continuous annulus around an entire upper and inner perimeter of the diffuser, and wherein the O-ring is seated in and moves with an inner surface of only one of the two annular halves.

4. The clamp of claim 3, wherein the joint is a pin allowing rotation of the two annular halves with respect to each other about a single axis with no other relative movement.

5. The clamp of claim 2, further comprising:
a biasing drive connected to and moving the O-ring and open to an outside surface of the clamp.

6. The clamp of claim 5, wherein the biasing drive is captured in an outer bore of the outside surface, wherein the outer bore connects to an inner groove housing the O-ring in the inner surface.

7. The clamp of claim 6, wherein the biasing drive includes a threaded cap, an internal spring, and a plunger that drive the O-ring.

8. The clamp of claim 7 wherein the plunger extends from the outer bore to the inner groove to contact and drive the O-ring.

9. The clamp of claim 2, wherein the O-ring is fabricated entirely of at least one of a stainless steel alloy, a zirconium alloy, and an aluminum alloy.

10. The clamp of claim 2, further comprising:
an axial mount on one of the clamp arms, wherein the axial mount is configured to secure to only an exterior of the diffuser so as to prevent relative movement between the one clamp arm and the diffuser.

11. The clamp of claim 2, wherein the spring is a leaf spring captured in one of the two opposite clamp arms, and wherein the O-ring is axially below the leaf spring.

12. The clamp of claim 1, wherein the two opposite clamp arms are semi-circular and join to create a continuous annulus, and wherein the O-ring extends around an entire inner surface of the annulus.

13. The clamp of claim 1, further comprising:
a biasing drive connected to and moving the O-ring and open to an outside surface of the clamp.

14. The clamp of claim 13, wherein the biasing drive is captured in an outer bore of the outside surface, wherein the outer bore connects to an inner groove housing the O-ring in an inner surface of the clamp arms.

15. The clamp of claim 14, wherein the biasing drive includes a threaded cap, an internal spring, and a plunger that drive the O-ring.

16. The clamp of claim 1, wherein the O-ring is fabricated entirely of at least one of a stainless steel alloy, a zirconium alloy, and an aluminum alloy.

* * * * *